(12) United States Patent
Mastinu et al.

(10) Patent No.: US 7,779,705 B2
(45) Date of Patent: Aug. 24, 2010

(54) ELASTIC JOINT WITH A TRANSLATING SPHERICAL HINGE AND FORCE AND MOMENT SENSOR IMPROVED BY MEANS OF THE SAID JOINT

(75) Inventors: Giampiero Mastinu, Cernobbio (IT); Massimiliano Gobbi, Stradella (IT)

(73) Assignee: Politecnico Di Milano, Milan (IT)

( * ) Notice: Subject to any disclaimer, the term of this patent is extended or adjusted under 35 U.S.C. 154(b) by 9 days.

(21) Appl. No.: 12/227,322

(22) PCT Filed: May 16, 2007

(86) PCT No.: PCT/IB2007/001335
§ 371 (c)(1),
(2), (4) Date: Nov. 13, 2008

(87) PCT Pub. No.: WO2007/135551
PCT Pub. Date: Nov. 29, 2007

(65) Prior Publication Data
US 2009/0173170 A1    Jul. 9, 2009

(30) Foreign Application Priority Data
May 22, 2006 (IT) .......................... MI2006A1000

(51) Int. Cl.
*G01L 1/00* (2006.01)
(52) U.S. Cl. .................. 73/862.381; 73/862.046
(58) Field of Classification Search ................................
73/862.041–862.046, 862.381–862.391
See application file for complete search history.

(56) References Cited

U.S. PATENT DOCUMENTS 3,873,914 A * 3/1975 Kesselring ................. 324/247
4,030,371 A * 6/1977 Bulman et al. ................ 74/5 F
4,762,006 A * 8/1988 Asakawa et al. ....... 73/862.044
5,330,351 A * 7/1994 Ransom et al. ............. 432/103

(Continued)

FOREIGN PATENT DOCUMENTS

EP         0 333 872 A        9/1989

(Continued)

OTHER PUBLICATIONS

PCT Search Report dated Dec. 11, 2008.

*Primary Examiner*—Max Noori
(74) *Attorney, Agent, or Firm*—Hedman & Costigan, P.C.; James V. Costigan (57) ABSTRACT

An elastic joint with a translating spherical hinge, i.e. a spherical hinge with a sliding joint, comprising an elastic articulated plane (13), a support (16) to which the elastic articulated plane (13) is rigidly constrained, and an axial element (14), positioned according to an axis (11) orthogonal to the plane (13), wherein the elastic articulated plane (13) comprises a series of elastic elements (12) arranged with a first end facing and rigidly connected to the axial element (14), and wherein the elastic elements (12) are flexible in any vertical plane comprising the axis (11) and in the horizontal plane (13) to allow four degrees of freedom or, respectively, the translation of the axial element (14) in the direction of the orthogonal axis (11) and the spatial rotation as well as the torsion around the axis (11). The joint according to the invention is particularly suitable for perfecting a force and moment sensor.

15 Claims, 7 Drawing Sheets

U.S. PATENT DOCUMENTS

| | | |
|---|---|---|
| 5,452,615 A | 9/1995 | Hilton |
| 5,452,622 A * | 9/1995 | Fenelon .................. 74/411 |
| 5,671,783 A * | 9/1997 | Zenoni et al. ............. 139/452 |
| 6,694,828 B1 * | 2/2004 | Nicot .................. 73/862.326 |
| 6,779,400 B1 * | 8/2004 | Thelen et al. ............. 73/471 |
| 2006/0037409 A1 | 2/2006 | Ichige |

FOREIGN PATENT DOCUMENTS

| | | |
|---|---|---|
| JP | 52-133270 A | 11/1977 |
| WO | WO2005/015146 A | 2/2005 |

* cited by examiner

ELASTIC JOINT WITH A TRANSLATING SPHERICAL HINGE AND FORCE AND MOMENT SENSOR IMPROVED BY MEANS OF THE SAID JOINT

The present invention relates to an elastic joint with a translating spherical hinge and force and moment sensor improved by means of the said joint.

In order to measure forces and moments between a tyre and the ground, but not only this, it is necessary to resort to the use of sensors capable of measuring a force vector and a moment vector applied with reference to a point of a structure.

Rigid sensors can be used, for example, positioned between the elements which exchange forces, or sensors comprising a measuring structure constrained in a statically determined way to the body whose stress is to be measured.

The sensor consists, for example, of a measuring structure comprising, in the central part, three arms, in which each arm is constrained to the supports connected to the body whose stress is to be measured by means of a joint consisting of a spherical translating hinge, i.e. a spherical hinge and a sliding joint.

Each translating spherical hinge has only two constraint degrees, allowing, in fact, four degrees of freedom, i.e. one degree of freedom for translation in a plane orthogonal to the constraint plane mentioned above, one degree of freedom for torsion and two degrees of freedom with respect to rotations.

The translating spherical hinges of the known type can, for example, be produced by combining with each other, in series, a spherical joint and a translating sleeve. These hinges however are subject to the friction, due to the use of smooth or ball bearings, which jeopardizes the sensitivity and accuracy of the measurements.

An objective of the present invention is to provide an elastic joint with a translating spherical hinge and a force and moment sensor improved by means of the said joint, which solve the above-mentioned drawbacks.

Another objective of the present invention is to provide an accurate and sensitive force and moment sensor.

Yet another objective of the present invention is to provide an elastic joint with a translating spherical hinge and an improved force and moment sensor which is particularly simple and functional, with reduced costs.

These objectives according to the present invention are achieved by providing an elastic joint with a translating spherical hinge as specified in claim 1.

Further characteristics of the elastic joint with a translating spherical hinge and a force and moment sensor improved by means of the said joint, are included in the dependent claims.

The characteristics and advantages of the elastic joint with a translating spherical hinge and a force and moment sensor improved by means of the said joint, according to the present invention, will appear more evident from the following illustrative and non-limiting description, referring to the schematic drawings enclosed, in which.

Figure 1:
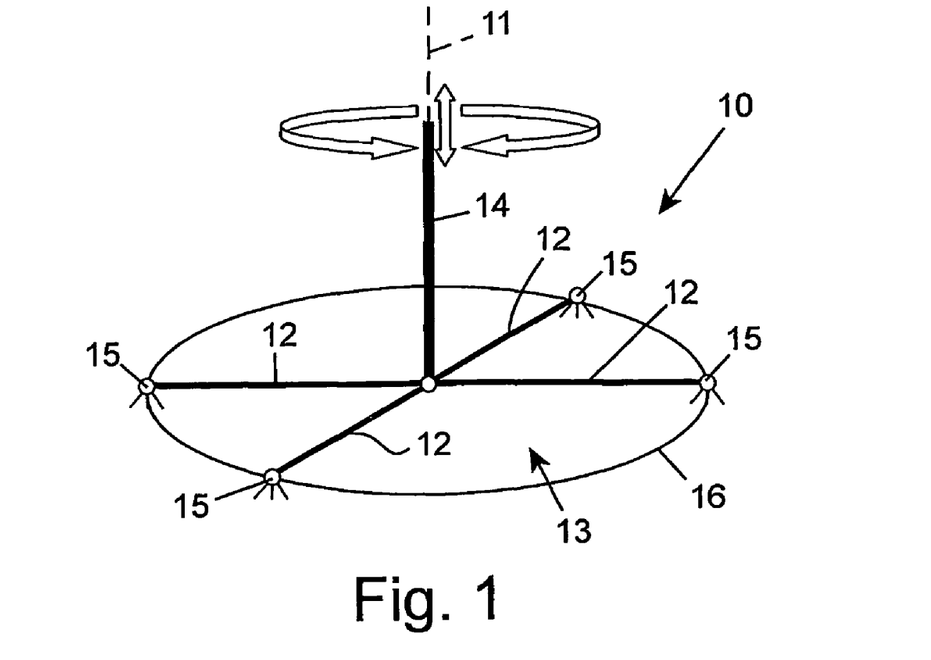
FIG. 1 shows the mechanical model of an elastic joint with a translating spherical hinge made by means of wires.
Figure 2:
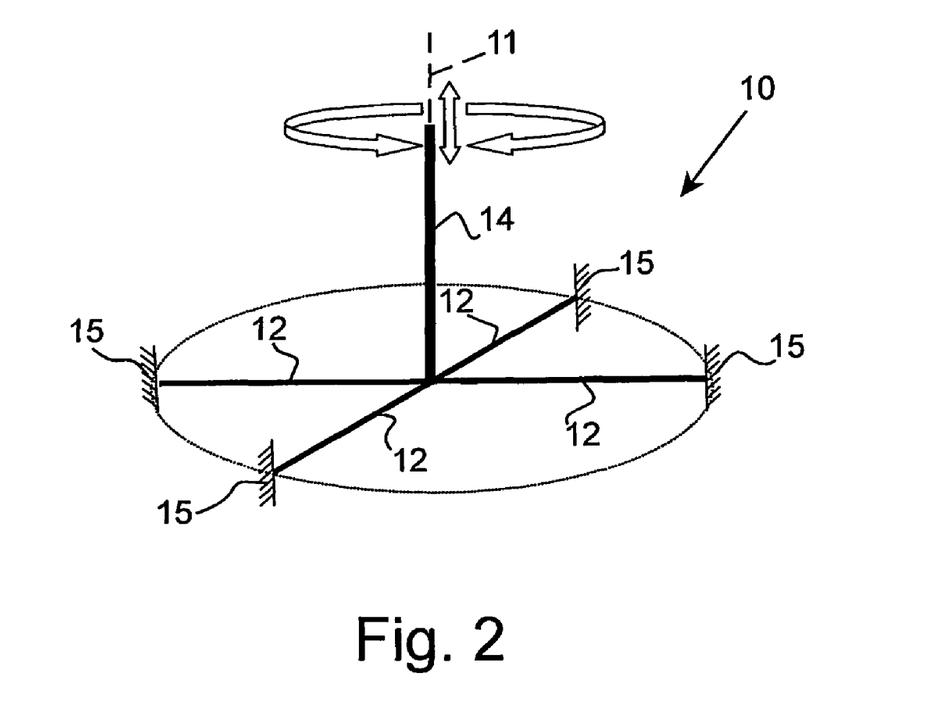
FIG. 2 shows the mechanical model of an elastic joint with translating spherical hinge produced with beams.
Figure 3A:
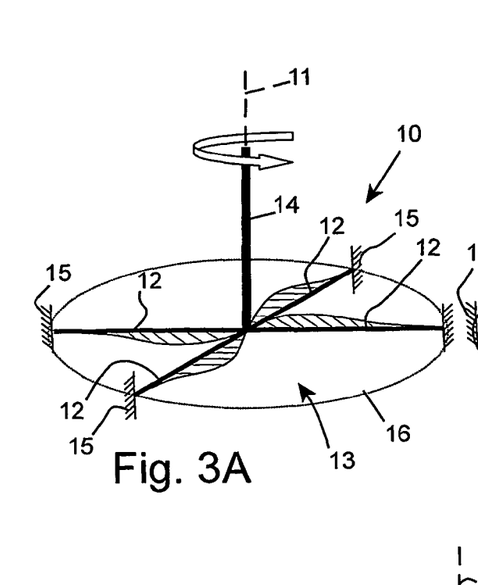
FIGS. 3A, 3B and 3C show the functioning principle of an elastic joint with a translating spherical hinge produced with beams.
Figure 3B:
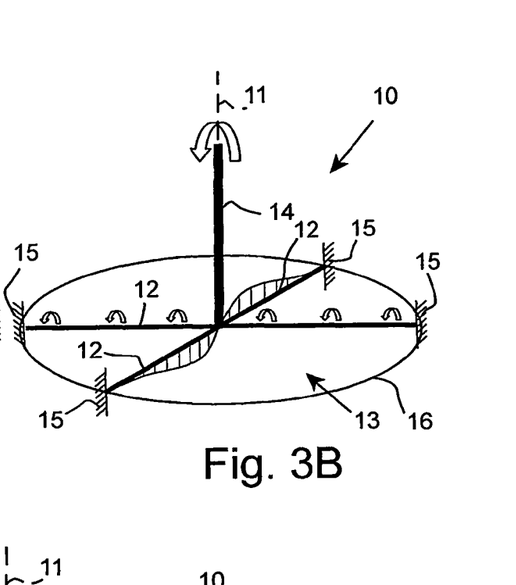
Figure 3C:
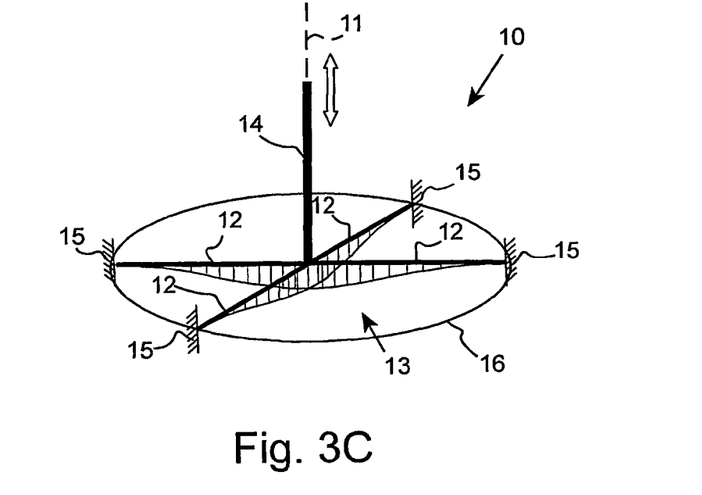

With reference to the FIGS. 1-3, the functioning mechanical principle of a joint with a translating spherical hinge, according to the present invention, is schematically shown and described.

With reference to FIG. 1, it can be noted that in order to produce a translating spherical hinge which should function for small displacements, a structure can be obtained wherein a vertical rod 14 can translate along its own axis 11 and spherically rotate around the central hinge. Horizontal elastic elements 12 are suitably stretched wires, or beams with constraints 15 at the ends, consisting of hinges (generally spherical hinges). This structure is four times unstable and, in addition to the three spatial rotations of the vertical rod 14, it also allows the small movement in a vertical direction of the same vertical rod 14. This structure can function with a number of wires or beams 12, higher or equal to three. With two wires or beams 12, in fact, it does not function properly as there is a fragility in the orthogonal direction with respect to the axes of the two beams, or wires 12, and lying in an horizontal plane 13 which contains the two beams or wires 12.

With reference to FIG. 2 and FIG. 3, a variation with respect to the mechanical model in FIG. 1 is presented. The constraints 15 of the structure consisting of the four horizontal beams 12 are in this case fixed joints and consequently a translating spherical hinge 10 is produced with associated elastic translational deformation and elastic rotational deformation. Upon examining FIGS. 3A, 3B and 3C, it can be observed that the horizontal beams 12, by twisting around the axis 11, flexing in the vertical plane, or in the horizontal plane 13, allow the formation of the elastic spherical hinge 10.

Again, the horizontal beams 12, by flexing in the vertical plane, allow the translation to be obtained (FIG. 3). FIG. 2 and FIG. 3 illustrate four horizontal beams 12; the beams 12 which form the elastic joint 10, can obviously be in a number higher than or equal to 3. With a single horizontal beam 12, in fact, there will be incorrect functioning with reference to the vertical translation; with two beams 12 there is an excessive deformation in the orthogonal direction with respect to the axes of the two beams 12 and lying in the horizontal plane 13 which contains the two beams 12. The problem of the excessive side pliability deformation is overcome, with the advantage of a simplified construction, by substituting the two beams with two sheets such as those illustrated in FIG. 7.

Figure 4:
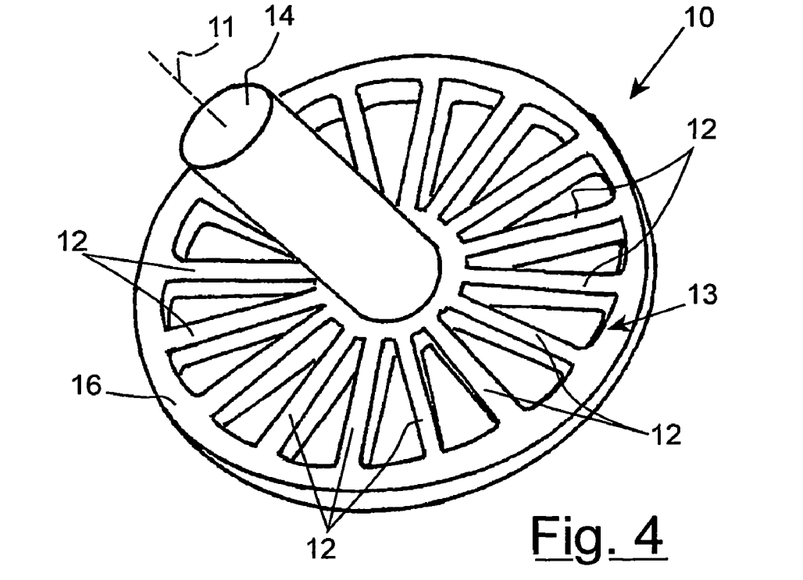
FIG. 4 is a perspective view of an embodiment of an elastic joint with a translating spherical hinge, produced with beams, object of the present invention.
Figure 5:
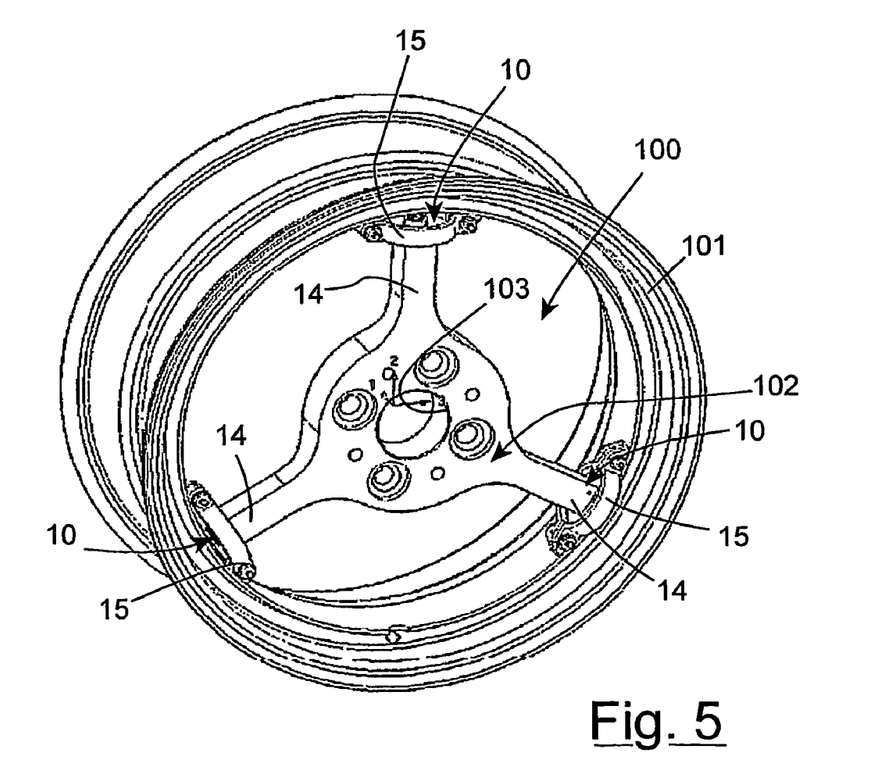
FIG. 5 shows a force and moment sensor improved by means of an elastic joint with a translating spherical hinge object of the present invention.
Figure 6A:
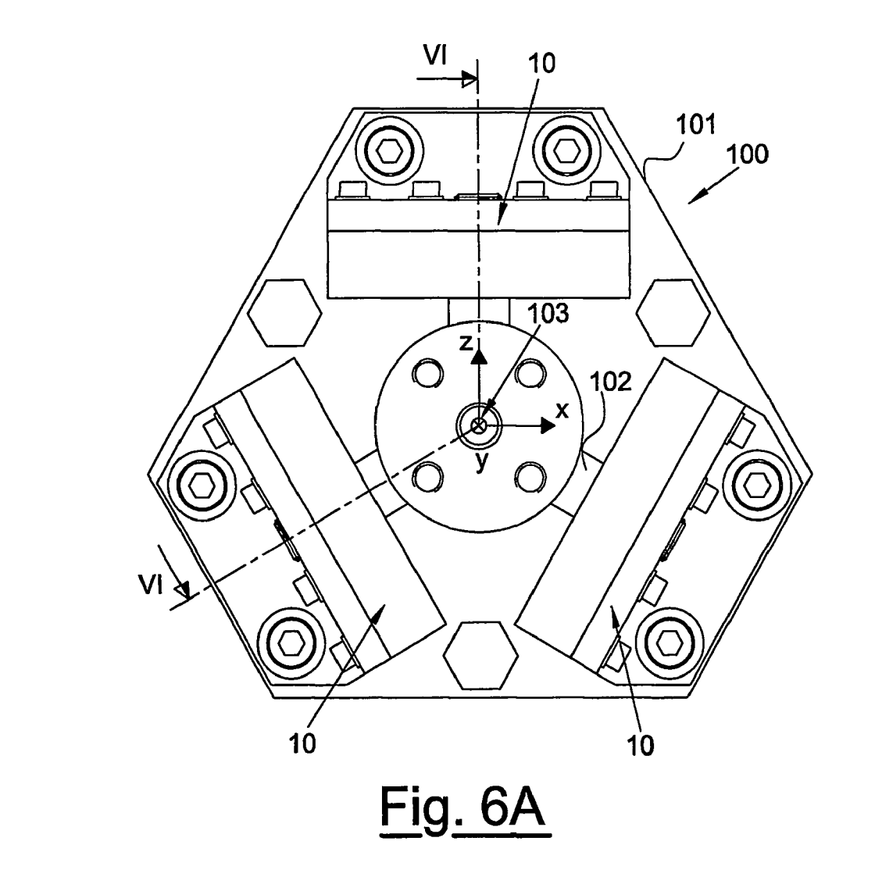
FIGS. 6A and 6B respectively show an overall design of a further force and moment sensor improved by means of an elastic joint with a translating spherical hinge, object of the present invention, and a section of the same along the plane marked by VI-VI of FIG. 6A.
Figure 6B:
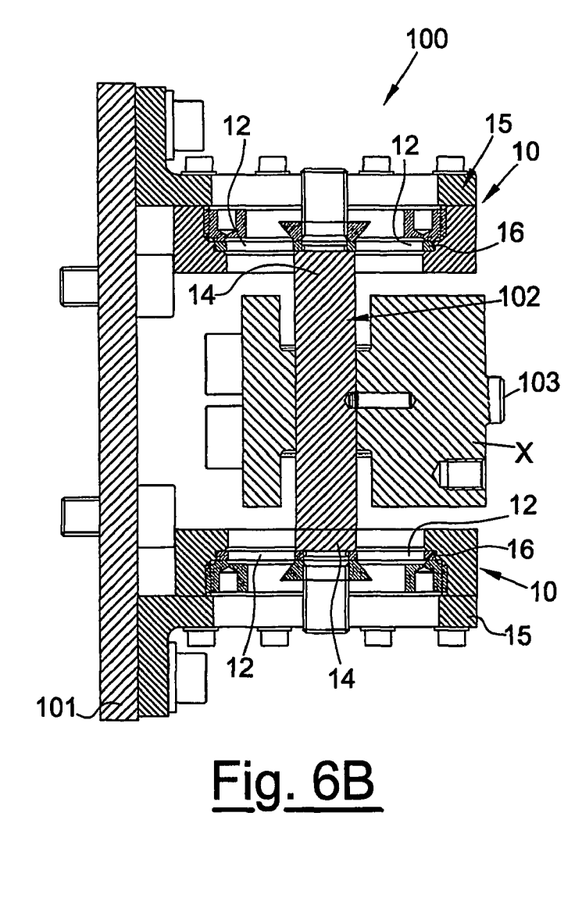

FIGS. 4, 5 and 6 illustrate an elastic joint, having a translating spherical hinge, indicated as a whole with 10, and two different embodiments of a force and moment sensor, indicated as a whole with 100, improved by means of the said joint 10.

The elastic joint with a translating spherical hinge 10, or the joint of the type with the spherical hinge with a sliding joint, is particularly suitable for being used in the force and moment sensor 100 which, in the example, comprises a three-armed measuring structure 102, connected by means of three joints 10 to a body 101 to which forces and moments to be measured are applied.

The elastic joint with a translating spherical hinge 10, object of the present invention, comprises a series of elastic elements 12, or at least three beams or two elastic laminae 12, positioned in a first horizontal plane with a first end facing so as to form the articulation elastic plane 13. The facing ends of the elastic elements 12 are rigidly connected to an axial rod element 14 arranged according to the axis 11 orthogonal to the articulation elastic plane 13. According what is shown in FIG. 4, a series of beams 12 are uniformly distributed in the horizontal plane 13, equidistanced between each other, or comprising equal angles between each other.

At the opposite ends, the beams 12 are connected to a rigid support 16, constrainable to the body 101 by means of a dap joint 15 (FIG. 5).

The beams 12 are flexible in any vertical plane comprising the orthogonal axis 11 and in the horizontal plane 13.

The articulation of the joint 10 takes place between the axial element 14 and the support 16 and allows four degrees of freedom, i.e. the translation of the axial element 14 in the direction of the orthogonal axis 11 and the spatial rotation of the axial element 14, by means of flexure of the elastic elements 12 in any vertical plane comprising the orthogonal axis 11, as well as the torsion of the axial element 14 around the same axis 11, by means of flexure of the elastic elements 12 in the horizontal plane 13, respectively.

Figure 7:
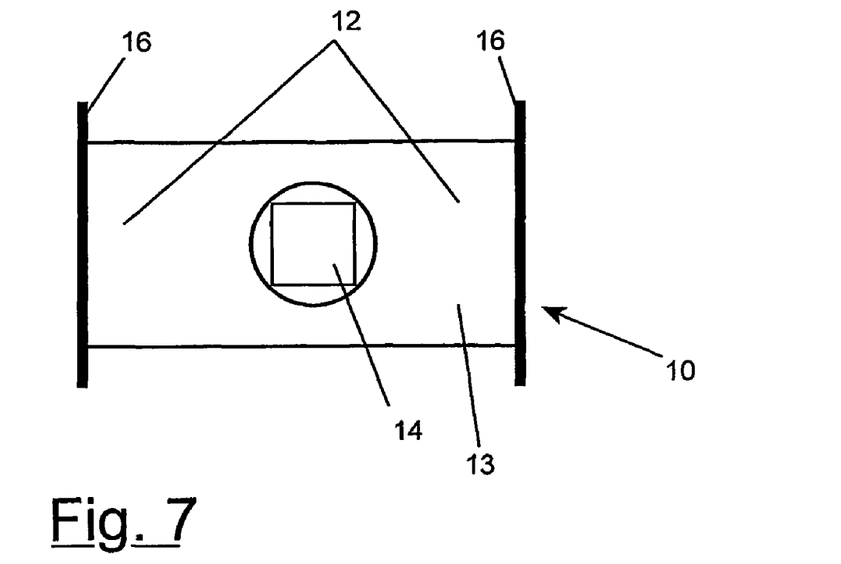
FIG. 7 shows an elastic joint, object of the present invention, comprising two aligned laminae.

The beams 12 situated in the horizontal plane 13, equidistanced between each other, can consist of two aligned laminae 12, having an extension in the articulation elastic plane 13 much greater than their thickness, as shown in FIG. 7.

The elastic elements 12, shown and described, can be made of different materials, for example, the wires 12 in FIG. 1 can be made with steel wires or Kevlar filaments, or different material, and immersed in a resin matrix. The beams or laminae 12 can be made of various materials, such as steel, plastic or composite material. The selection of the material, thickness and width is effected with the intent of optimizing the ratio between the rigidities.

The elastic joint with a translating elastic hinge 10, object of the present invention, constrains the axial element 14 and gives it a high rigidity with respect to the movements in the plane 13. The axial element 14, on the contrary, has an axially pliable behaviour, i.e. in the direction of the axis 11 and, due to the effect of the elastic elements 12, also the possibility of performing a spherical rotation.

Figure 9:
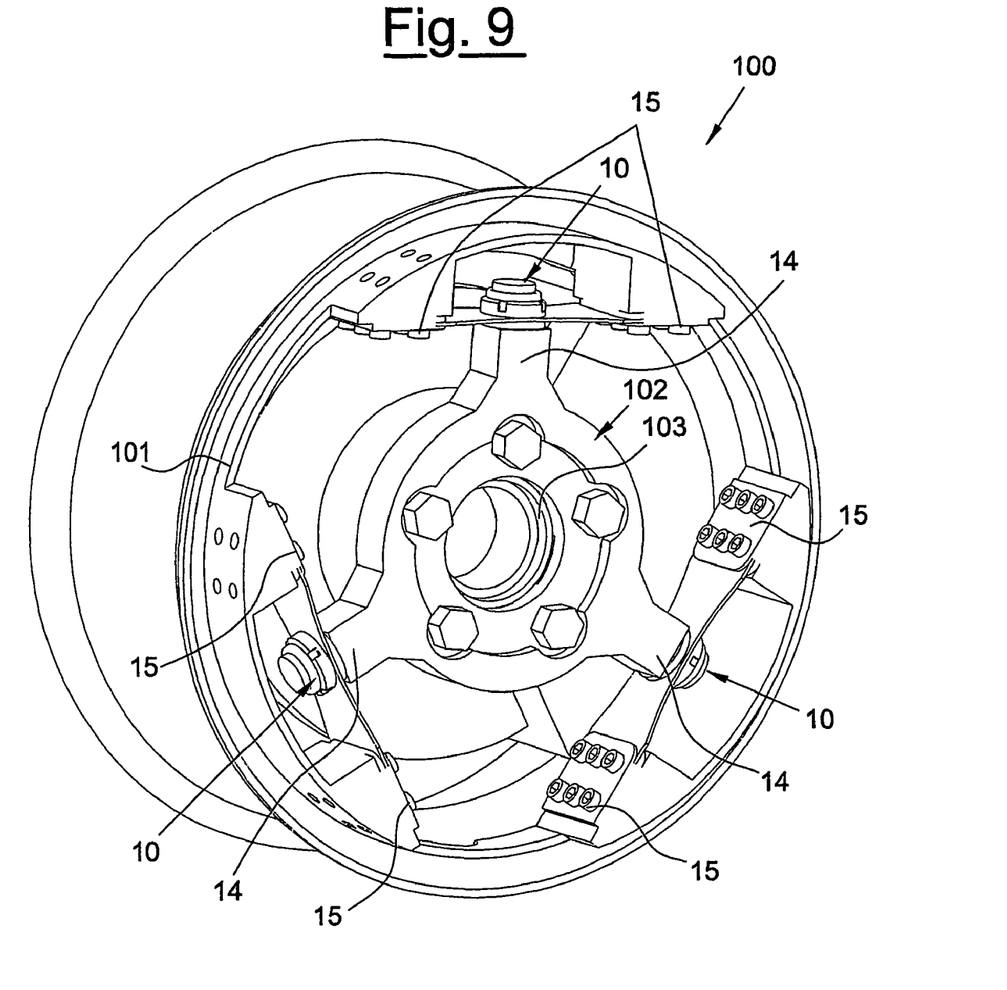
FIG. 9 shows a third embodiment of a force and moment sensor with the elastic joint of FIG. 7.

A possible non-exclusive application of the elastic joint with a translating spherical hinge, object of the present invention, is the force and moment 100 sensor, shown in FIGS. 5, 6, and 9.

The sensor 100 comprises the three-arm measuring structure 102 (FIG. 8) connected to the body 101, to which forces and moments to be measured are applied by means of three elastic joints with a translating spherical hinge 10.

Figure 8:
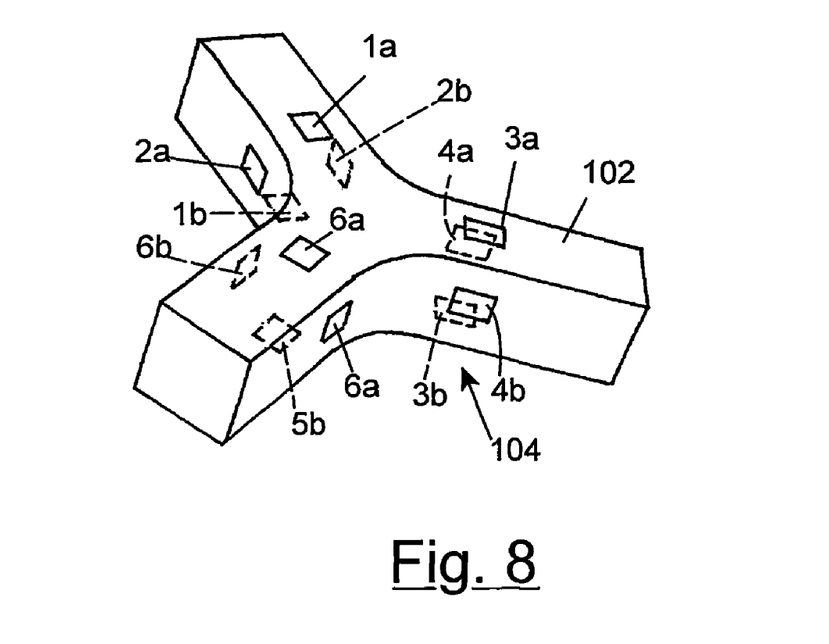
FIG. 8 is a schematic view of the measuring structure of the sensor of FIGS. 5 and 6.

In FIG. 5, the measuring structure of FIG. 8 is assembled as a dynamometric hub centred on a hub 103 of a wheel 101 and the arms, or an extension of the same, represent the axial element 14 of the joint 10.

The support 16 of the joint 10, on the other hand, is rigidly connected to the body 101, in the example to the wheel rim, by a constraint of the dap joint type 15.

FIGS. 6A and 6B show a further force and moment sensor 100 improved by means of an elastic joint with a translating spherical hinge, object of the present invention, for use as a static force and moment sensor. The sensor 100 of FIGS. 6A and 6B does in fact allow the forces to be measured which are exchanged between a first supporting element 101 to which the joints 10 are constrained and a second axial element 103, integral with the measuring structure 102. The measuring structure 102 is statically determined and is equipped with means for the measuring 104 of six stress magnitudes from which the force and moment vectors acting on the body 101 can be mathematically obtained.

According to a first embodiment of the sensor 100, the six magnitudes are revealed on the arms of the measuring structure 102. Each arm is in fact subjected to stress along its own length by two orthogonal flexing moments. The two stress flexures, which are exerted by the above two orthogonal flexing moments, can be measured by two pairs of strain gauges applied on opposite sides of the arms themselves, as schematically shown in FIG. 8, in which 1a, 1b, 2a, 2b, 3a, 3b, 4a, 4b, 5a, 5b, 6a and 6b indicate six pairs of strain gauges which form an example of possible measuring means.

In a third embodiment of the sensor 100, shown in FIG. 9, the elastic joint with a translating spherical hinge 10 comprises two aligned laminae 12 having extension in the elastic articulation plane 13, according to what is illustrated in FIG. 7.

Figure 10:
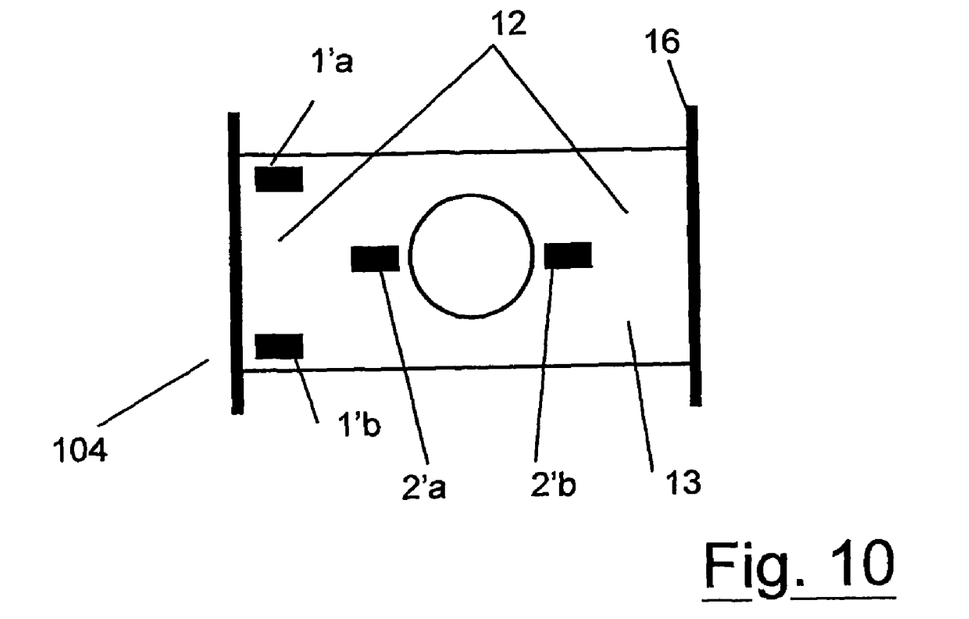
FIG. 10 schematically shows the positioning of two pairs of strain gauges on the two aligned laminae of the elastic joint of FIG. 7.

The six stress magnitudes can be measured directly on the three pairs of laminae 12, also used as a sensitive element. FIG. 10 schematically shows the positioning of two pairs of strain gauges 1'a, 1'b, 2'a, 2'b on the two aligned laminae 12, for measuring the constraint reaction acting in a lateral direction and for measuring the constraint reaction acting in a longitudinal direction on the laminae 12, respectively.

Other measuring means 104 which can be used for measuring the flexure are, for example, movement sensors which reveal the movements of the laminae 12, directly applied to the laminae 12.

From the six measurements, a force vector F is univocally obtained, dissembled into three vectors directed along three coordinated axes and a moment vector T dissembled into three vectors directed along three coordinated axes, i.e. the six generalized forces acting on the body.

Other measuring means 104 which can be used are piezoelectric elements or elements of another kind, not shown, which can be positioned between the end of each of the three arms of the measuring structure 102 and each of the relative joints with a translating spherical hinge 10. These measuring means are capable of measuring two forces orthogonal with respect to the axis 11 and orthogonal with respect to each other and mathematically obtaining the force F and moment T vectors acting on the body 101.

Furthermore, the use of silicon, or another similar technology, allows the production of an elastic joint with a translating spherical hinge 10 and a relative sensor 100 in nanoscale, i.e. with minimum dimensions. In this case, it is possible to mathematically obtain the force F and moment T vectors acting on the body 101, by means of movement measuring means 104 positioned at the end of each of the three arms of the measuring structure 102.

Figure 11:
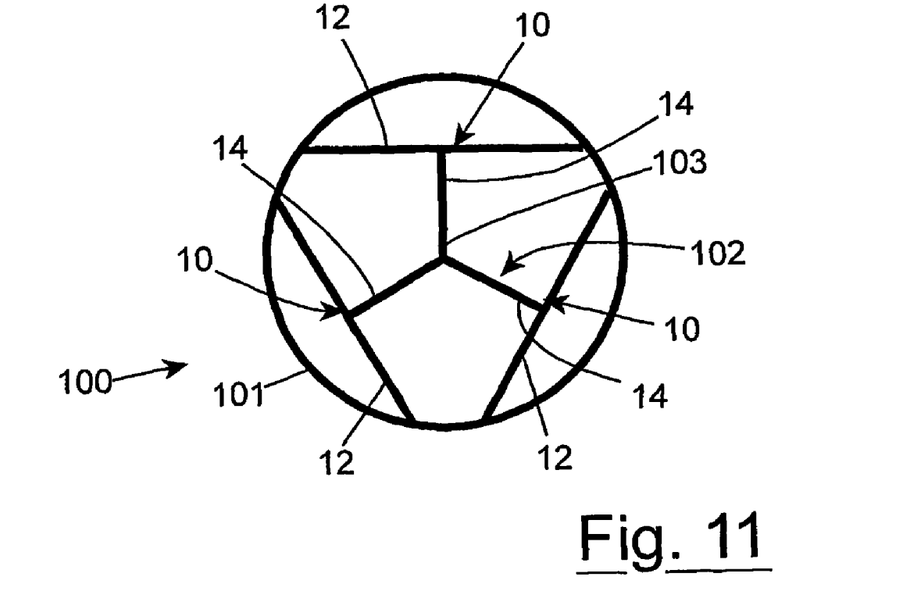
FIG. 11 schematically shows a last embodiment of force and moment sensor produced as a dynamometric hub in which each translating spherical hinge is integrally produced with the measuring structure and the rim channel itself.

Finally, with reference to FIG. 11, this shows a last embodiment of a force and moment sensor 100 produced as a dynamometric hub, in which each translating spherical hinge 10 is produced integrally with the measuring structure 102 and with the same rim channel 101 as a road or off-road vehicle forming a single structure. This rim is extremely economical as it provides localized deformation areas which allow the acting forces and moments to be surveyed, at substantially the same cost as a normal rim.

The elastic joint with a translating spherical hinge, object of the present invention, has the advantage of eliminating the problem of friction.

The elastic joint with a translating spherical hinge also allows the force and moment sensor to be improved, allowing optimum performances, which are more accurate and sensitive, on the part of the sensor, in addition to a relatively economical construction cost.

The sensor improved by means of the elastic joint with a translating hinge is also suitable for the production of an extremely precise and low-cost dynamometric hub with the possibility of generalized use on vehicles.

The elastic joint with a translating spherical hinge and the force and moment sensor improved by means of the said joint thus conceived can undergo numerous modifications and variants, all included in the invention; furthermore, all the details can be substituted by technically equivalent elements. In practice, the materials used, as also the dimensions, can vary according to the technical requirements.

The invention claimed is:

1. An improved force and moment sensor (100), suitable for measuring forces and moments acting on a body (101), comprising a three-arm measuring structure (102) having ends connected to said body (101) each by means of a joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13).

2. The sensor according to claim 1, characterized in that it comprises measuring means (104) of six stress magnitudes applied directly on said joints having a translating spherical hinge (10), wherein by means of said measuring means (104), it is possible to mathematically obtain the force (F) and moment (T) vectors acting on the body (101).

3. The sensor according to claim 1, characterized in that it comprises measuring means (104) of six stress magnitudes applied on the three arms of said measuring structure (102), wherein by means of said measuring means (104), it is possible to mathematically obtain the force (F) and moment (T) vectors acting on the body (101).

4. The sensor according to claim 1, characterized in that it comprises measuring means (104) positioned between one end of each of the three arms of said measuring structure (102) and each of the relative joints having a translating spherical hinge (10), said measuring means (104) being piezoelectric elements capable of measuring two forces orthogonal with respect to the axis (11) and orthogonal with respect to each other, wherein by means of said measuring means (104), it is possible to mathematically obtain the force (F) and moment (T) vectors acting on the body (101).

5. The sensor according to claim 1, characterized in that it is produced in nanoscale with the technology based on the use of silicon, or other technology.

6. The sensor according to claim 5, characterized in that it comprises movement measuring means (104) positioned at one end of each of the three arms of said measuring structure (102), wherein by means of said measuring means (104), it is possible to mathematically obtain the force (F) and moment (T) vectors acting on the body (101).

7. The sensor according to claim 1, characterized in that said measuring structure (102) is assembled centered on a hub (103) of a wheel, or body (101) and wherein the arms of said measuring structure (102) form said axial element (14) of the joint (10), said support (16) of the joint (10) being connected to a rim of a wheel (101).

8. The sensor according to claim 7, characterized in that said three joints having a translating spherical hinge (10) are integrated with said measuring structure (102), in said body, or rim (101) and with said hub (103) forming a rim, or dynamometric hub, produced in a single piece.

9. The sensor according to claim 1, characterized in that the joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said elastic elements (12) are distributed in the plane (13) equidistanced between each other and comprise angles equal to each other.

10. The sensor according to claim 9 where the joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said translating spherical hinge (10) comprises at least two elastic laminae (12).

11. The sensor according to claim 10 where the joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated, plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said translating spherical hinge (10) comprises two elastic laminae (12) aligned in said horizontal plane (13), said two laminae (12) having an extension in the elastic articulation plane (13) much greater than their thickness, said two laminae (12) being equipped with measuring means (104) for measuring the constraining reaction acting in a lateral direction and acting in a longitudinal direction on said two laminae (12), respectively.

12. The sensor according to claim 9 where the joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said translating spherical hinge (10) comprises at least three beams or wires (12).

13. The sensor according to claim 9 where the joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said translating spherical hinge (10) comprises elastic elements (12) that are spirally positioned around said axis (11).

14. An improved force and moment sensor (100), suitable for measuring forces and moments acting on a body (101), comprising a three-arm measuring structure (102) having ends connected to said body (101) each by means of a joint having a translating spherical hinge (10) comprising a spherical hinge with a sliding joint, characterized in that it comprises an elastic articulated plane (13), a support (16) to which the elastic articulated plane (13) is rigidly constrained, and an axial element (14), positioned according to an axis (11) orthogonal to the plane (13), wherein said elastic articulated plane (13) comprises a series of elastic elements (12) arranged with a first end facing and rigidly connected to the axial element (14), wherein said elastic elements (12) are flexible in any vertical plane comprising said axis (11) and in said horizontal plane (13) to allow four degrees of freedom or, respectively, the translation of said axial element (14) in the direction of the orthogonal axis (11) and the spatial rotation of said axial element (14), by means of flexure of said elastic elements (12) in any vertical plane comprising said axis (11), as well as the torsion of said axial element (14) around the axis (11), by means of flexure of said elastic elements (12) in said horizontal plane (13) wherein said three-arm measuring structure (102) is assembled centered on a hub (203) of a wheel, or body (101) and wherein the arms of said measuring structure (102) form said axial element (14) of the joint (10), said support (16) of the joint (10) being connected to a rim of a wheel (101).

15. The sensor according to claim 14, characterized in that said three joints having a translating spherical hinge (10) are integrated with said measuring structure (102), in said body, or rim (101) and with said hub (103) forming a rim, or dynamometric hub, produced in a single piece.

\* \* \* \* \*